Feb. 21, 1967 W. LEE ROY HENDERSON 3,305,255
STRUCTURAL FRAMEWORK CORNER
Filed Aug. 27, 1964
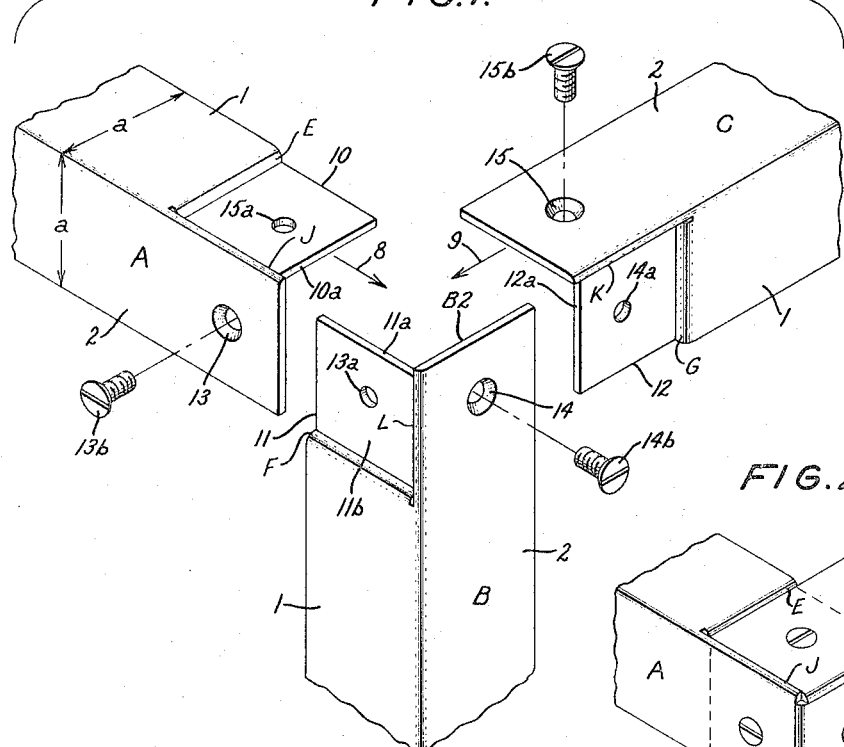
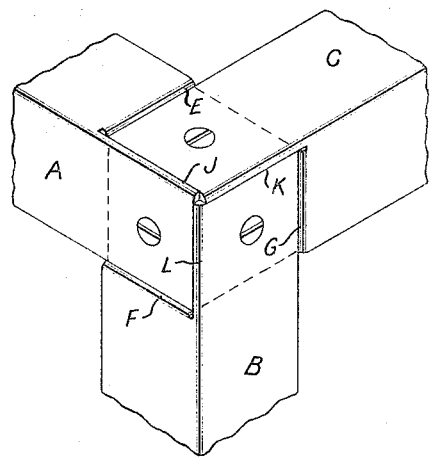
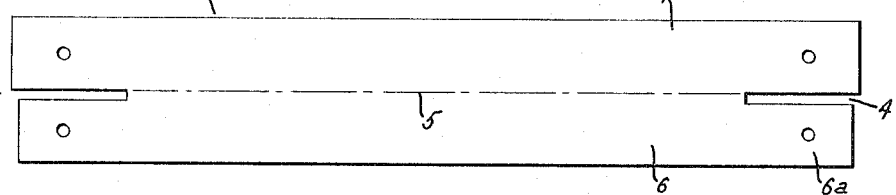
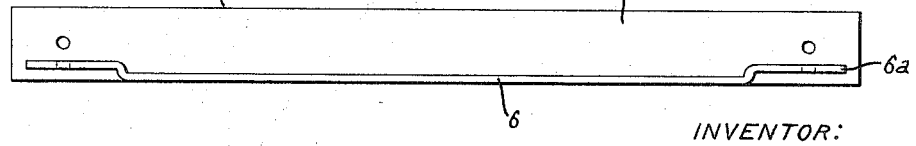
INVENTOR:
WAYNE LEE ROY HENDERSON,

United States Patent Office 3,305,255
Patented Feb. 21, 1967

3,305,255
STRUCTURAL FRAMEWORK CORNER
Wayne Lee Roy Henderson, West Hartford, Conn., assignor to General Electric Company, a corporation of New York
Filed Aug. 27, 1964, Ser. No. 392,378
4 Claims. (Cl. 287—189.36)

This invention relates to metal framework for enclosures for electrical apparatus and the like, more particularly to corners for such framework and it has for an object provision of a simple, reliable and inexpensive corner of this character.

Another object of the invention is the provision of a structural framework corner that is formed by the intersection of three angle members in such a manner as to present three smooth mutually perpendicular external surfaces.

A further object of the invention is the provision of a structural framework corner that is mechanically sound and strong.

Still another object of the invention is the provision of a structural corner formed by the intersection of three mutually perpendicular angle members that may be assembled and disassembled with the aid of simple tools.

In carrying the invention into effect in one form thereof, three angle members each having two flanges of equal width are disposed in mutually perpendicular relationship. Each of the angle members has a structural configuration at one of its ends that is identical with the structural configuration of the corresponding end of each of the other two angle members. Each of the identical structural end configurations has two parts which respectively interengage complementary mating parts of the other two structural end configurations in the assembled state of the angle members. One of the mating parts of the structural end configuration of each angle member is formed by inwardly offsetting an end portion of one of the two flanges to enable it to overlap the end portion of the non-corresponding flange of one of the other two angle members.

For a better and more complete understanding of the invention, reference should now be had to the following specification and to the accompanying drawings of which:

FIGURE 1 is an exploded view in perspective of a structural corner embodying the invention;

FIGURE 2 is an assembled view in perspective of the structural corner illustrated in FIGURE 1;

FIGURE 3 is a plan view of an angle component of the invention in an intermediate stage of fabrication, and FIGURE 4 is a view in elevation of an angle component of the invention in a subsequent intermediate stage of fabrication.

Referring now to the drawings, a structural corner embodying the invention comprises identical end configurations of structural angle members A, B, and C. These angle members are made from identical stock and each comprises two longitudinally extending flanges of equal width and occupying planes that are perpendicularly disposed with respect to each other. For example, the width $a$ of flange 1 of angle member A is equal to the width $a$ of flange 2. Similarly the flanges 1 and 2 of angle members B and C have equal widths which are equal to the width $a$ of the flanges of angle member A.

The angle members A, B, and C are made of a suitable material such as cold rolled steel having a suitable thickness and a suitable width. For example, the thickness of the stock may be .137 inch and the width may be $3^{25}/_{32}$ inches. A strip 3 of the desired length of such material is illustrated in FIGURE 3.

In the fabrication of an angle member the strip 3 is slotted at one or both ends as required by the particular application. In the illustration in FIGURE 3, the strip 3 is slotted at both ends. However, only the right hand end will be described. It is provided with a slot 4. The width of the slot 4 is slightly greater than the thickness of the material. For material having a thickness of .137 inch a slot width of $3/_{16}$ inch would be appropriate. The length of the slot is slightly greater than the width $a$ of the flange of the angle member that is to be fabricated from the strip. For example, for a flange width of 2 inches a slot length of $2^{1}/_{16}$ inches would be suitable. The slot 4 is entirely on one side of the center line 5 of the strip and, as shown, is located in the side 6 with one longitudinal edge coincident with the center line 5.

The end 6$a$ of side 6 is shortened with respect to the corresponding end of the other side 7 by an amount approximately equal to the thickness of the strip material. For example, in the case of a .137 inch strip thickness it would be appropriate to terminate the end 6$a$ of side 6 approximately $5/_{32}$ inch short of the corresponding end of side 7.

By means of a suitable forming tool, the end portion 6$a$ is offset from the plane of side 6 by an amount slightly greater than the thickness of the material. For a material thickness of .137 inch an offset of $1/_{64}$ inch would be suitable. The length of the offset portion is the same as the length of the slot 4.

After offsetting, the flat strip 3 is folded on its center-line to form an angle member of which the flanges 1 and 2 occupy planes that are perpendicular with respect to each other. The fold is made so that the offset portion 6$a$ is on the inside of the angle and so that the inner edge of the offset portion 6$a$ substantially abuts against the inner surface of side 7.

The three angle members A, B, and C each having an end configuration identical with the end configuration of the angle illustrated in FIGURE 4 may be assembled in the manner indicated in FIGURE 1 to form a structural corner with smooth external faces as illustrated in FIGURE 2. In assembling the angle members to form a corner, the angle member B is the upright corner post. The angle member A is slid in the direction of arrow 8 and the angle C is slid in the direction of arrow 9 to bring the mating parts of the identical end configurations of the three angle members into inter-engagement. Specifically, the angle member A is moved to a position in which the underneath surface of offset portion 10 rests on the top edge 11$a$ of offset point 11 and the exterior surface 11$b$ of angle member B overlaps the inner surface of flange 2 of angle member A. The angle member C is then moved in the direction indicated to a position in which the exterior surface of offset portion 12 overlaps the interior surface B2 of flange 2 of angle member B and the edge 12$a$ of offset portion 12 abuts the inside surface of offset portion 11 of angle member B. In this position, the edge 10$a$ of offset portion 10 of angle member A abuts the inner surface of offset portion 12 of angle member C and the upper surface of offset portion 10 overlaps the underneath surface of flange 2 of angle member C.

For the purpose of securely maintaining the angle members A, B, and C in the assembled positions illustrated in FIGURE 2, suitable fastening means such as bolts are provided. As shown in FIGURE 1 a bolt hole 13 is provided in the flange 2 of angle member A and a corresponding bolt hole 13$a$ is provided in the offset portion 11 of angle member B. Similar bolt holes 14 and 15 are provided in the flanges 2 of angle members B and C respectively and corresponding bolt holes 14$a$ and 15$a$ are provided in the offset portions 12 and 10 of angle members C and A respectively. When the angle members A, B, and C are in the assembled position illustrated in FIGURE 2, bolt holes 13, 14 and 15 are in register, i.e., in alignment with bolt holes 13a, 14a, and 15a, respectively, and bolts 13b, 14b, and 15b may be passed through the pairs of aligned bolt holes and secured by means of nuts screwed on their threaded ends. Preferably the bolts 13b, 14b and 15b are of the flat head screw type and the bolt holes 13, 14 and 15 are counter sunk so that when the bolts are tightened the assembled corner will present three intersecting smooth external surfaces.

The strength of the assembly is substantially increased by the additional inter-engaging of abutting surfaces provided by the invention as compared to prior comparable structures. Such additional abutments are indicated at E, F, and G, and at J, K, and L.

These abutments also facilitate assembly, since they help to keep the first two pieces assembled in their proper relation prior to assembly of the third piece.

If desired, the mechanical strength of the corner may be increased by bonding with an adhesive or by welding. The corner structure of the invention is ideal for either process. For a corner fabricated of steel, aluminum, brass or copper an epoxy base adhesive will produce a corner of high mechanical strength.

It will be observed that the three angle members A, B, and C are identical, not only in construction but also in dimensions, including placement of the holes, thus greatly facilitating manufacture and assembly. The use of identical members, including placement of holes, is not possible with ordinary straight-sided angle members.

Although a particular embodiment of the invention has been shown and described changes and modifications not departing from the invention will readily suggest themselves to persons skilled in the art. In the appended claims it is aimed to cover all such changes and modifications as fall within the true spirit and scope of the invention.

What I claim as new and desire to secure by Letters Patent of the United States is:

1. A structural corner comprising:
   (a) three angle members of sheet material of predetermined thickness disposed in mutually perpendicular relationship;
   (b) each of said angle members comprising two flanges extending substantially at right angles to each other;
   (c) an end portion of one of said flanges being offset inwardly from the general plane of said flange by an amount substantially equal to said predetermined thickness;
   (d) the corresponding end portion of the other of said flanges being co-planar with the general plane of said flange;
   (e) said three angle members being assembled to provide a smooth corner structure with said offset end portion of each of said three angle members overlapping said co-planar end portion of one of the other two angle members; and
   (f) means joining said overlapping end portions of said flanges.

2. A structural corner as defined in claim 1 wherein:
   (a) said offset end portion of each of said three angle members has at least one hole therein aligned with a hole in the corresponding overlapping co-planar end portion of said one of said other two angle members, and
   (b) fastening means positioned in said aligned holes and securing said offset end portions to said corresponding overlapping co-planar end portions.

3. A structural corner assembly comprising:
   (a) three angle members disposed in mutually perpendicular relationship,
   (b) each of said angle members comprising first and second longitudinally extending flanges of equal width disposed at right angles to each other,
   (c) an end portion of said first flange being offset inwardly by an amount approximately equal to the thickness of the angle material,
   (d) the length of said offset portion being approximately equal to the width of said second flange,
   (e) said offset portion being terminated short of the corresponding end of said second flange by an amount approximately equal to the thickness of said angle material, and
   (f) said three angle members being assembled into a smooth corner structure with the offset portion of each of said three angle members overlapping an end portion of the second flange of one of the other two angle members.

4. A structural corner assembly as defined in claim 3 wherein:
   (a) said offset portion of each of said three angle members has at least one hole therein aligned with a hole in the corresponding one of said overlapping end portions; and
   (b) fastening means positioned in said aligned holes and securing each of said offset portions to each of said corresponding overlapping end portions respectively.

References Cited by the Examiner

UNITED STATES PATENTS

| | | | |
|---|---|---|---|
| 898,751 | 9/1908 | Krantz. | |
| 1,462,617 | 7/1923 | Ohnstrand | 52—280 X |
| 1,825,010 | 9/1931 | Murphy | 52—287 |
| 2,076,811 | 4/1937 | Ehlers | 189—36 |
| 2,649,172 | 8/1953 | Allen | 52—592 |
| 2,767,815 | 10/1956 | Brandstetter et al. | 52—664 |
| 2,776,030 | 1/1957 | Bush | 186—36 |

HARRISON R. MOSELEY, *Primary Examiner.*

A. I. BREIER, *Assistant Examiner.*